United States Patent [19]

Godeau et al.

[11] Patent Number: 5,332,268
[45] Date of Patent: Jul. 26, 1994

[54] RAPID COUPLING DEVICE FOR SNAP-FASTENING A TUBULAR MEMBER OR A SET OF TUBULAR MEMBERS TO ONE OR MORE ENDPIECES

[75] Inventors: Denis Godeau, Vielles Maisons/Joudey; Philippe Exandier, Montargis, both of France

[73] Assignee: Hutchinson, Paris, France

[21] Appl. No.: 63,904

[22] Filed: May 19, 1993

[30] Foreign Application Priority Data

May 21, 1992 [FR] France ............................... 92 06195

[51] Int. Cl.⁵ ........................................... F16L 35/00
[52] U.S. Cl. ..................................... 285/26; 285/305; 285/93; 285/921
[58] Field of Search ............... 285/26, 93, 29, 921, 285/305, 137.1

[56] References Cited

U.S. PATENT DOCUMENTS

| | | |
|---|---|---|
| 3,314,696 | 4/1967 | Ferguson et al. |
| 3,403,930 | 10/1968 | Bernier |
| 5,169,178 | 12/1992 | Hunzinger ............................. 285/26 |
| 5,209,523 | 5/1993 | Godeaw ............................ 285/305 X |
| 5,219,185 | 6/1993 | Oddenino ............................ 285/26 |

FOREIGN PATENT DOCUMENTS 8624767 1/1988 Fed. Rep. of Germany .
4037308 4/1992 Fed. Rep. of Germany .

*Primary Examiner*—Dave W. Arola
*Attorney, Agent, or Firm*—Bell, Seltzer, Park & Gibson

[57] ABSTRACT

Two hoses in the cooling circuit of a vehicle engine are secured to respective tubular members for coupling to respective tubular endpieces of a heat exchanger, e.g. a radiator or a heater. The tubular members have respective through openings extending transversely to their longitudinal axes, and they are associated with a plate disposed in the vicinity of said openings. Each endpiece has a catch groove associated with a respective ramp. In the coupled position, the grooves coincide the openings. Respective branches of a U-shaped spring clip are received in the openings and engage in the grooves when the endpieces are pushed into the tubular members, thereby snap-fastening the coupling device together. The tips of the branches have respective lugs that co-operate with tabs of the plate. The tab are shaped to cam the lugs during snap-fastening in such a manner as to ensure that, providing snap-fastening has taken place properly, the entire spring clip is shifted to a position that is visibly distinct for ease of checking and that is also locked such that uncoupling can be performed only by means of a special tool for splaying the branches apart.

7 Claims, 4 Drawing Sheets

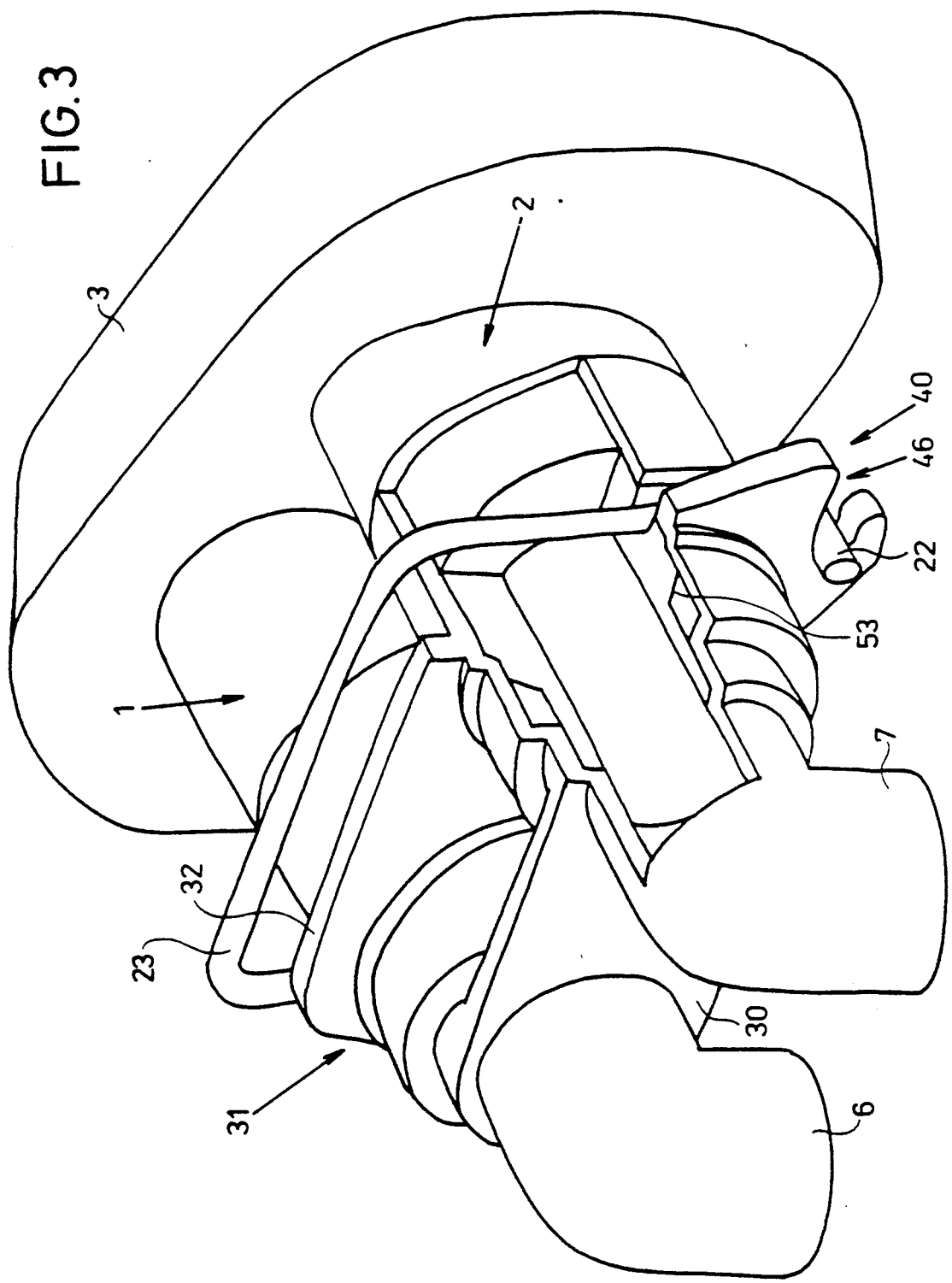

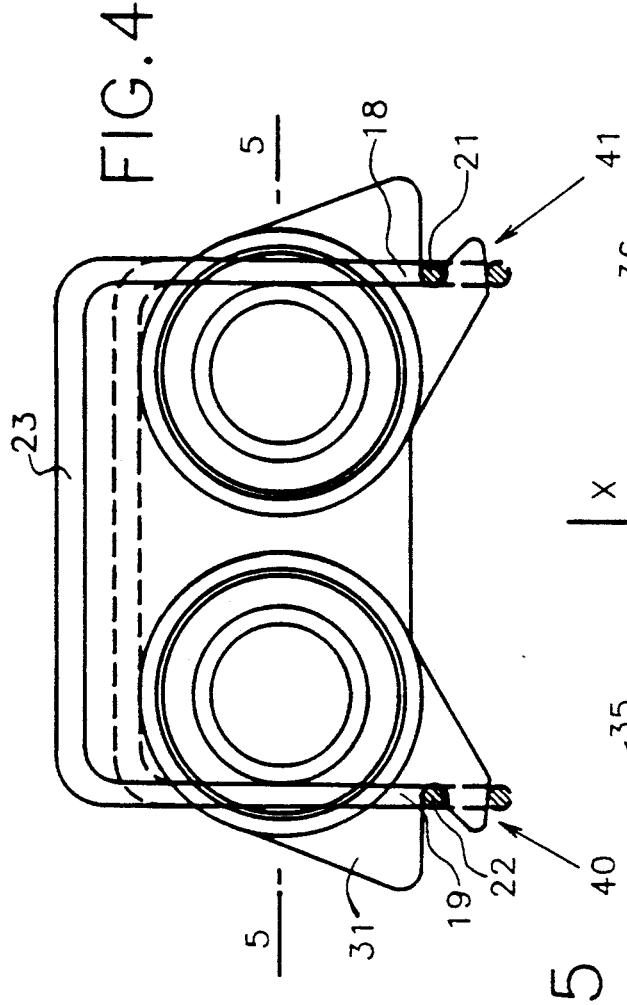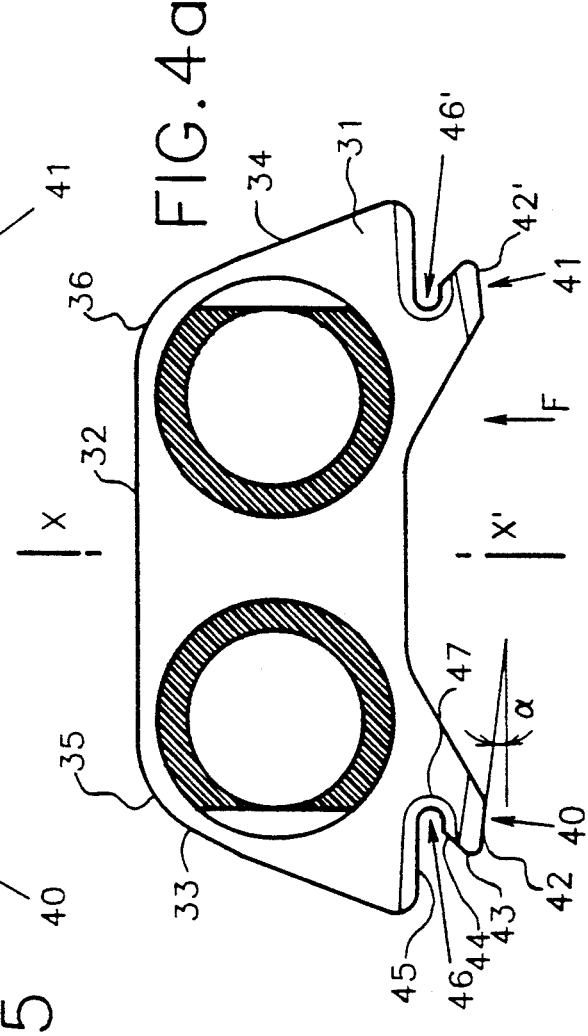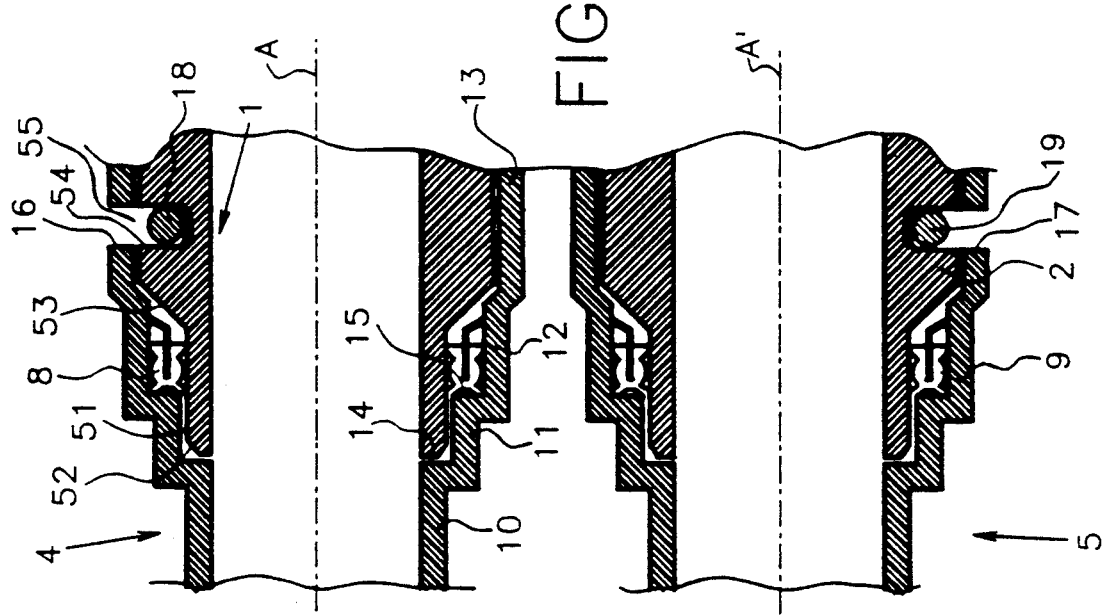

RAPID COUPLING DEVICE FOR SNAP-FASTENING A TUBULAR MEMBER OR A SET OF TUBULAR MEMBERS TO ONE OR MORE ENDPIECES

FIELD OF THE INVENT/ON

The invention relates to a rapid coupling device for snap-fastening a tubular member or a set of tubular members to one or more endpieces, and it relates in particular to such a device for coupling water pipes in the cooling circuit of a motor vehicle engine to inlet and outlet endpieces of a heat exchanger or of a heater for said vehicle.

More particularly, the invention relates to a coupling device of the type enabling rapid coupling and uncoupling by means of a spring clip having branches that are substantially parallel and that are received, prior to coupling of the device, in through openings formed in a tubular member, with said branches being received, when the device is in its coupled condition, in a transverse groove formed in the wall of the endpiece, which endpiece has a tapering bearing surface so as to make the clip operative.

BACKGROUND OF THE INVENTION

One such device with a U-shaped clip is shown, for example, by U.S. Pat. No. 3,314,696 or FR-A-2 280 852 which nevertheless relate only to connecting a single tubular member to an endpiece and which also are unsuitable for making it simple to check visually that the connection has been achieved in satisfactory manner. Consequently, the devices of those documents are incapable of solving the problem posed which is that of providing a rapid coupling device for fastening a plurality of tubular members to endpieces and for providing an indication after snap-fastening as to whether a satisfactory connection has been achieved.

Although the problem of connecting a plurality of tubular members to endpieces is raised in DE-4 037 308, it is solved only by means of a multiplicity of connection elements and without any particular attempt at providing a satisfactory visual indication that connection has been achieved.

OBJECTS AND SUMMARY OF THE INVENTION

Consequently, a general object of the present invention is to solve the problem posed by means of a device which is simple in structure and low in cost, which is easy to implement and which avoids any risk of untimely uncoupling.

Another object of the invention is to provide such a device which does not require a large amount of force during coupling while nevertheless guaranteeing satisfactory sealing after coupling.

Another object of the invention is to provide such a coupling device which makes it possible to check on the condition of the locking it provides merely by visual inspection.

The present invention provides a rapid coupling device for snap-fastening a tubular member or a set of tubular members to one or more endpieces, in particular for coupling water pipes of the cooling circuit of a motor vehicle engine to the inlet and outlet endpieces of a heat exchanger or a heater of said vehicle, with the water pipes or hoses being secured to said tubular members, sealing between a tubular member and an endpiece or between the tubular members and the endpieces which are united by an element extending substantially perpendicularly to their longitudinal axes being provided by sealing gaskets interposed between them, each endpiece having a frustoconical ramp adjacent to a cylindrical free end, wherein:

the element uniting the tubular members or associated with the tubular member is a plate disposed in the vicinity of one or more through openings formed in said tubular member(s) and directed substantially transversely to said longitudinal axes;

each endpiece has a groove adjacent to the frustoconical ramp and directed to correspond with the openings of the tubular members;

it includes at least one spring clip with each of its branches being received in one of said openings and terminating at its free end in a respective bent-back lug directed substantially perpendicularly to said branch, the clip having a web interconnecting said branches, which web extends generally perpendicularly to said openings, the lugs co-operating with tabs of the plate that are shaped in such a manner as to guide said lugs when said ramps resiliently splay apart the branches of the clip while an endpiece is being inserted into a tubular member or while endpieces are being inserted in tubular members, thereby causing the lugs to pass from a first position in which the web is in the immediate vicinity of said tubular member(s) to a second position in which the web is further away from said tubular member(s), which position corresponds to the coupling device being coupled.

When the device is placed so that the web interconnecting the branches of the spring clip is substantially horizontal, the first position may be called a "low" position and the second position may be called a "high" position, with the greater or lesser distance between the web and the tubular members and/or the plate providing a simple and reliable indication that the coupling has been satisfactorily coupled once snap-fastening has taken place after bringing the endpieces into the tubular members, and this remains true regardless of the position of the device relative to the members with which it is associated.

According to another feature of the invention, the tabs of the plate are also shaped to define notches which they mask in part and in which said lugs are received at the end of the insertion motion of the endpieces into the tubular members, i.e. when the branches of the spring clip are received in said grooves.

As a result, any risk of accidental uncoupling is avoided, since the clip cannot be removed to enable the endpieces to be uncoupled from the tubular members without the help of a tool enabling said lugs of the piece to be moved apart so as to extract them from said notches and cause them to escape from said tabs of the plate.

The invention provides for the plate that unites the tubular members, or that is associated with a single tubular member, to be rigid, or in a variant to have a certain amount of flexibility enabling the device to adapt to different spacings.

In which case, the spring clip is M-shaped instead of being U-shaped as it is with a rigid plate, or in a variant, the clip is the result of connecting two U-shaped clips together.

BRIEF DESCRIPTION OF THE DRAWINGS

The invention will be well understood on reading the following description which is made with reference to the accompanying drawings, in which:

FIG. 3 is a view analogous to FIGS. 1 and 2, but it is partially cut away and it shows the device after coupling;

FIG. 4 is an end view of the device showing the conditions of the spring clip before and after coupling;

FIG. 4A is a view of the tubular members in cross-section on a plane close to the plate; and FIG. 5 is a section view on line 5—5 of FIG. 4 showing the coupled condition.

MORE DETAILED DESCRIPTION

The coupling device shown in the figures is of the type for coupling the water pipes in a cooling circuit of a motor vehicle engine and to the inlet and outlet endpieces of a heat exchanger or of a heater of said vehicle. Nevertheless, the invention is naturally not limited to such a device, and is applicable to all coupling devices enabling rapid coupling and decoupling of a set of tubular members and endpieces using a spring clip or even when coupling a single tubular member to a single endpiece.

Figure 1:
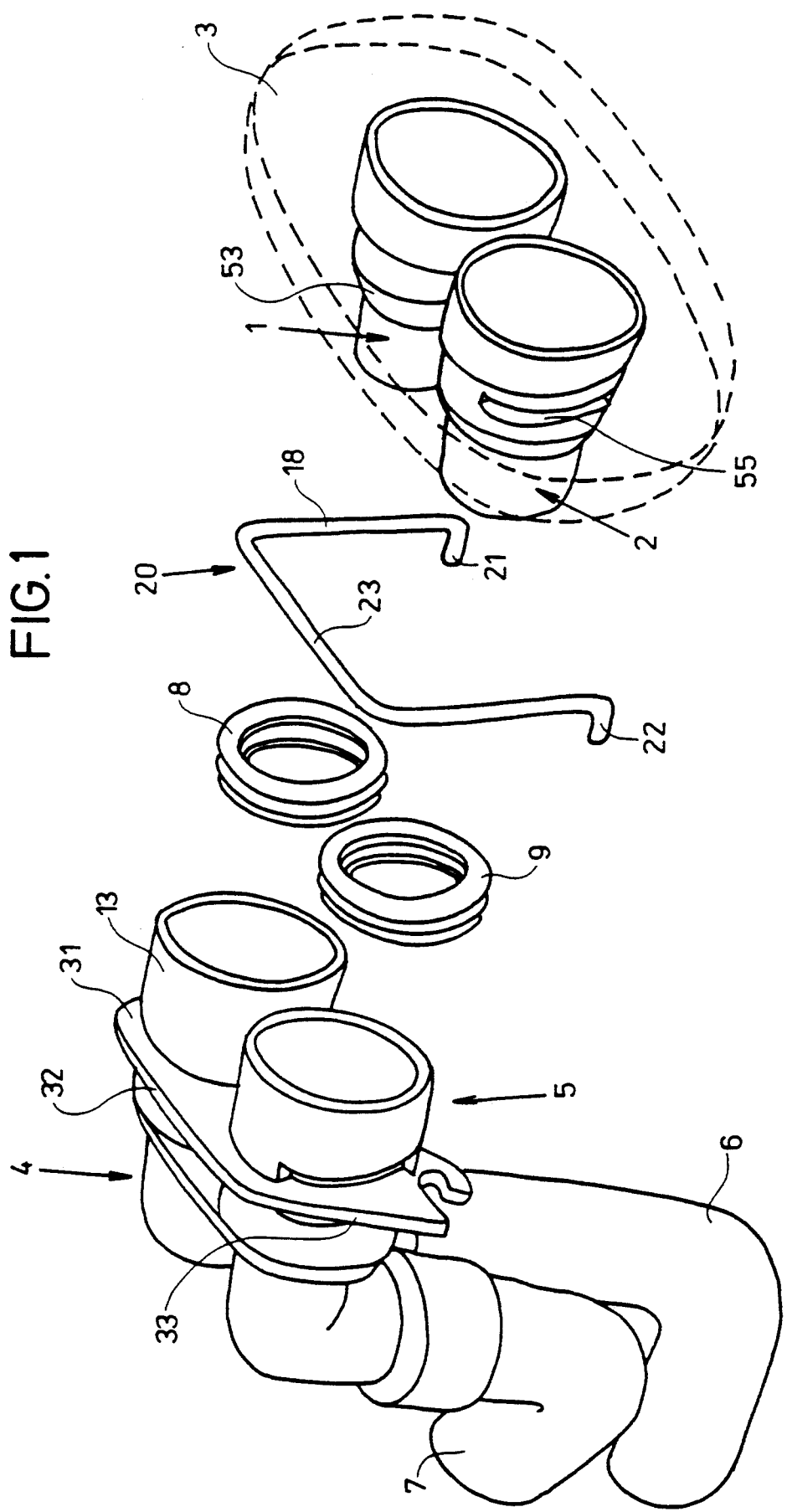
FIG. 1 is a diagrammatic exploded perspective view of a device of the invention before its component parts have been united.

In the device described and shown, the endpieces 1 and 2 that project from the heat exchanger (more precisely from the radiator tank 3) are designed to be coupled with tubular members 4 and 5 having flexible water pipes or hoses 6 and 7 of the cooling circuit of a motor vehicle engine fixed thereto (FIG. 1), with sealing gaskets 8 and 9 being interposed (see FIGS. 1 and 5). Each tubular member 4 and 5 is advantageously made of molded plastic and is shaped to comprise cylindrical portions 10, 11, 12, and 13 about a common axis A and of progressively increasing diameters, thereby forming a first shoulder 14, and a second shoulder 15 against which the sealing gasket 8 or 9 bears. The cylindrical portion 13 of each tubular member that is furthest from the hose 6 or 7 is cut to have two diametrically opposite transverse slots or openings 16 and 17 of sufficient width to receive the parallel branches 18 and 19 of a U-shaped spring clip 20.

The clip is made of metal or of a plastic that is sufficiently strong and resilient, and it has respective bent-back lugs 21 and 22 at the free ends of its branches 18 and 19, which lugs extend substantially perpendicularly to said branches, and the opposite ends of the branches are interconnected by a rectilinear web 23 that also extends perpendicularly to the branches.

The tubular members 4 and 5 are connected together by a spacer 30, and between said spacer and the free ends of the cylindrical portions 13 they are connected together by a plate 31 disposed in the vicinity of the through openings or slots 16 and 17 that are substantially perpendicular to the longitudinal axes A and A' of the members of 4 and 5 respectively. As can clearly be seen in FIGS. 4 and 4A, the outline of the plate 31 is somewhat trapezium-shaped and it is thus defined by an edge 32 (forming the small base of the trapezium), by side edges 33 and 34 connected to the small base via respective rounded corners 35 and 36, and defined in what might be called the "other" corners of the trapezium by tabs 40 and 41. As can be seen in FIG. 4A, each tab has a free end edge 42 that slopes at a small angle α relative to a plane perpendicular to the axis of symmetry X-X' of the plate, said end edge extending towards the side edge 33 in the form of a rounded tip 43 and then an edge 44 which co-operates with an edge 45 that is substantially perpendicular to the axis X-X' to define a notch 46 whose bottom 47 is of a diameter that is slightly greater than that of the lugs 21 and 22 of the spring clip 20. The notches 46 and 46' (of the tabs 40 and 41, respectively) that are designed to receive the lugs 21 and 22 of the branches of the clip are "masked" by the tabs 40 and 41 when the plate 31 is looked at in the direction of arrow F in FIG. 4A, i.e. when looked at in an upwards direction, assuming that the web 23 of the clip 20 is disposed substantially horizontally and that the edge 32 of the plate is its top edge.

The above-described tubular members and spring clip 20 are suitable for co-operating with the endpieces 1 and 2, each of which has a first cylindrical portion 51 of outside diameter that is complementary to the inside diameter of the cylindrical portion 11 of the corresponding tubular member 4 or 5, and which is slightly greater than the inside diameter of the sealing gasket 8 or 9, with the free ends of the portions 51 being chamfered to facilitate insertion of the endpieces into the tubular members and to facilitate sliding along the gaskets 8 or 9 which are advantageously of the type having reinforced lips.

As shown clearly in FIGS. 3 and 5, the cylindrical portion 51 of endpiece 1 or 2 is extended at a distance from its chamfered end 52 by a frustoconical ramp 53 that flares towards the rear of the endpiece, with the rear face 54 of the ramp 53 defining a groove 55 in which one of the branches 18 and 19 of the U-shaped clip 20 is received.

Figure 2:
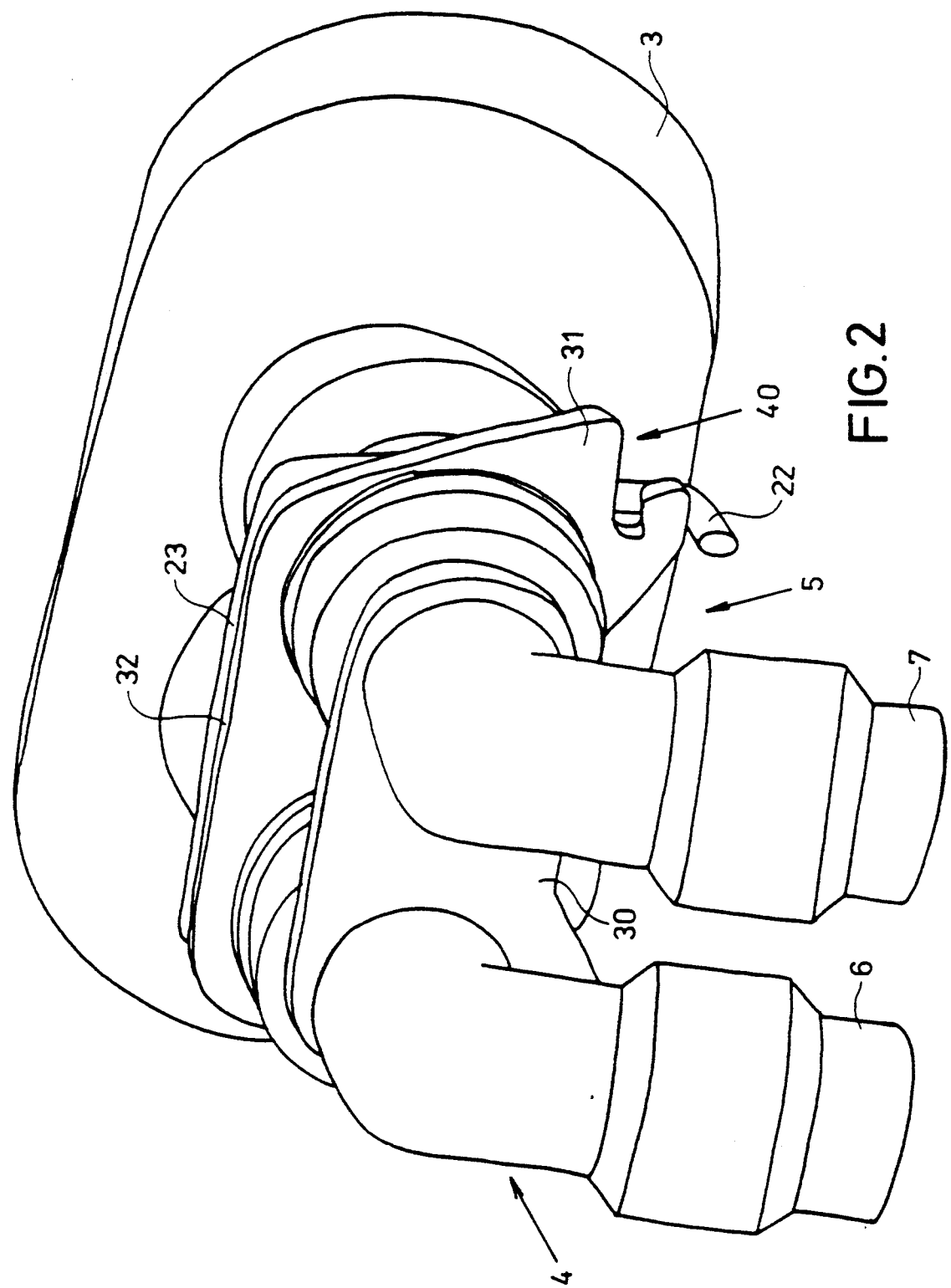
FIG. 2 is a view analogous to FIG. 1 but seen from a different direction and after the component parts have been united.

The initial condition of the tubular members 4 and 5 and of the clip 20 is as shown in FIG. 2 and in dashed lines in FIG. 4, i.e. the lugs 21 and 22 of the clip are in contact with the free end edges 42 and 42' of the tabs 40 and 41 respectively, and the web 23 is in the vicinity of the tubular members 4 and 5. When the tubular members are brought up to the endpieces 1 and 2 of the heat exchanger for coupling purposes, the branches of the U-shaped clip are splayed apart away from their initial positions by the ramps 53 on the endpieces 1 and 2, and as the endpieces move closer to the tubular members, the lugs 21 and 22 of the clip slide without difficulty over the slightly sloping edges 42 and 42' until they go past the rounded ends 43 thereof. When the rear face 54 of each ramp 53 of the endpieces is substantially in alignment with the rear face of the slots or passages 16 and 17, the branches of the spring clip 20 penetrate into the grooves 55. The coupling device is then locked and simultaneously the lugs 21 and 22 of the clip are received in the notches 46 and 46' of the plate 31. The web 23 is then as shown in solid lines in FIGS. 3 and 4, i.e. it is further away from the tubular members than it was in its initial condition, thereby indicating that coupling has been performed satisfactorily.

Coupling force is low, less than 10 daN, and the fact that the lugs 21 and 22 of the spring clip 20 are received in the notches 46 and 46' prevents any danger of accidental uncoupling.

To uncouple the coupling device, the branches 18 and 19 of the U-shaped clip must firstly be splayed apart by means of a suitable tool, prior to applying traction on the tubular members 4 and 5 and the hoses which are associated therewith, thus moving them away from the endpieces 1 and 2 and undoing the previous coupling.

The invention is naturally not limited to the embodiment described above.

Thus, the invention includes embodiments in which the tubular members are not rigidly connected together but, on the contrary, are connected together so as to provide a certain amount of flexibility in fitting by uniting them by means of a spacer and/or a plate similar to the plate 31 but provided with a certain degree of flexibility, as may be obtained, for example, by an assembly that includes clearance (i.e., a loose-fitting assembly) or by using two half-pieces that are themselves united by means including clearance or that allow for relative displacement. Under such circumstances the device includes either two U-shaped spring clips that are connected together with the ability to move relative to each other, or else a single clip which is M-shaped and somewhat deformable in its web-constituting portion that is now more or less V-shaped as compared with being rectilinear as it is in a U-shaped clip.

We claim:

1. A rapid coupling device comprising:
   at least one tubular member, each tubular member having a longitudinal axis, an open end and at least one radial opening directed substantially perpendicularly to said longitudinal axis;
   a corresponding endpiece for each said tubular member, each endpiece having a cylindrical free end positioned within the corresponding tubular member, a smaller diameter portion adjacent said cylindrical free end, a frustoconical ramp adjacent to said smaller diameter portion, a larger diameter portion adjoining said frustoconical ramp, and at least one radial groove formed in said larger diameter portion adjacent to said frustoconical ramp and positioned to correspond with said at least one radial opening in said tubular member;
   a planar uniting element, means for affixing said planar uniting element to said tubular member and said planar uniting element disposed transversely to said longitudinal axis in the vicinity of said radial opening, said planar uniting element having a plurality of tabs, said tabs defining a plurality of notches adjacent thereto;
   at least one sealing gasket interposed between and sealingly engaging each said tubular member and its corresponding endpiece and located inwardly from said open end beyond said radial opening; and
   at least one spring clip, said clip having a web portion and branches extending from the web portion, one of said branches extending into said at least one radial opening of said tubular member and penetrating into said at least one radial groove in said endpiece to thereby snap fasten the endpiece to the tubular member, and the ranch terminating at its free end in a bent-back lug, the lug engaging and cooperating with one of said notches adjacent said tabs of said uniting element.

2. The device according to claim 1 wherein said web member extends generally perpendicularly to said radial openings and perpendicularly to said longitudinal axes, and wherein said branch members are received in said radial openings and said lugs engage said tabs which are adapted to guide said lugs into said notches.

3. The device according to claim 1, wherein said spring clip member is generally U-shaped, and wherein said lugs are guided into said notches along said tabs when said branches are resiliently splayed apart by said ramp and subsequently received in said radial grooves upon insertion of an endpiece into a tubular member.

4. The device according to claim 3 comprising more than one tubular member, and wherein said tubular members are movable relative to each other.

5. The device according to claim 4 wherein said uniting element has apertures formed therein, and said tubular members extend loosely through said apertures.

6. The device according to claim 4 wherein said uniting element comprises two half-pieces and means for connecting said half pieces together so as to allow for relative displacement of said tubular members.

7. The device according to claim 4 wherein said spring clip is generally M-shaped and said web member is deformable.

* * * * *